(12) United States Patent
Kuo et al.

(10) Patent No.: US 10,719,729 B2
(45) Date of Patent: Jul. 21, 2020

(54) SYSTEMS AND METHODS FOR GENERATING SKIN TONE PROFILES

(71) Applicant: Perfect Corp., New Taipei (TW)

(72) Inventors: Chia-Chen Kuo, Taipei (TW); Ho-Chao Huang, New Taipei (TW)

(73) Assignee: PERFECT CORP., New Taipei (TW)

( * ) Notice: Subject to any disclaimer, the term of this patent is extended or adjusted under 35 U.S.C. 154(b) by 114 days.

(21) Appl. No.: 16/114,555

(22) Filed: Aug. 28, 2018

(65) Prior Publication Data

US 2019/0377969 A1    Dec. 12, 2019

Related U.S. Application Data

(60) Provisional application No. 62/681,174, filed on Jun. 6, 2018.

(51) Int. Cl.
*G06K 9/46* (2006.01)
*G06T 7/73* (2017.01)
(Continued)

(52) U.S. Cl.
CPC ....... *G06K 9/4647* (2013.01); *G06K 9/00268* (2013.01); *G06Q 30/0282* (2013.01); *G06T 7/74* (2017.01); *G06T 7/90* (2017.01)

(58) Field of Classification Search
CPC .... G06K 9/4647; G06K 9/00268; G06T 7/90; G06T 7/74; G06Q 30/0282
See application file for complete search history.

(56) References Cited

U.S. PATENT DOCUMENTS 7,612,794 B2    11/2009    He et al.
7,856,118 B2    12/2010    Kalla et al.
(Continued)

FOREIGN PATENT DOCUMENTS

CN    106388781 A    2/2017
CN    106846422 A    6/2017
(Continued)

OTHER PUBLICATIONS

Rosalyn R. Porte et al. "Performance of Histogram-Based Skin Colour Segmentation for Arms Detection in Human Motion Analysis Application" World Academy of Science, Engineering and Technology International Journal of Computer and Information Engineering vol. 3, No. 4, 2009.
(Continued)

*Primary Examiner* — Lewis G West
(74) *Attorney, Agent, or Firm* — McClure, Qualey & Rodack, LLP (57) ABSTRACT

A computing device with a digital camera obtains a reference image depicting at least one reference color and calibrates parameters of the digital camera based on the at least one reference color. The computing device captures, by the digital camera, a digital image of an individual utilizing the calibrated parameters. The computing device defines a region of interest in a facial region of the individual depicted in the digital image captured by the digital camera. The computing device generates a skin tone profile for pixels within the region of interest and displays a predetermined makeup product recommendation based on the skin tone profile.

20 Claims, 5 Drawing Sheets

(51) Int. Cl.
*G06T 7/90* (2017.01)
*G06K 9/00* (2006.01)
*G06Q 30/02* (2012.01)

(56) References Cited

U.S. PATENT DOCUMENTS

| | | | |
|---|---|---|---|
| 8,027,521 B1* | 9/2011 | Moon | G06K 9/00288 |
| | | | 382/118 |
| 8,634,640 B2 | 1/2014 | Bhatti et al. | |
| 8,908,932 B2 | 12/2014 | Corcoran et al. | |
| 8,933,994 B2 | 1/2015 | Gross et al. | |
| 9,064,279 B1 | 6/2015 | Tuan et al. | |
| 9,104,908 B1 | 8/2015 | Rogers et al. | |
| 9,251,567 B1* | 2/2016 | Liu | G06T 5/00 |
| 9,270,866 B2 | 2/2016 | Liu | |
| 9,449,412 B1 | 9/2016 | Rogers et al. | |
| 9,858,685 B2 | 1/2018 | Nichol et al. | |
| 10,387,937 B1* | 8/2019 | Tuan | G01J 3/50 |
| 10,558,848 B2* | 2/2020 | Rivard | G06K 9/6212 |
| 2003/0011607 A1* | 1/2003 | Spaulding | H04N 1/644 |
| | | | 345/581 |
| 2006/0178904 A1 | 8/2006 | Aghassian et al. | |
| 2006/0269111 A1* | 11/2006 | Stoecker | G06F 19/321 |
| | | | 382/128 |
| 2007/0058858 A1 | 3/2007 | Harville et al. | |
| 2007/0071314 A1 | 3/2007 | Bhatti et al. | |
| 2008/0281728 A1* | 11/2008 | Gomez | G06Q 30/00 |
| | | | 705/26.1 |
| 2008/0311061 A1 | 12/2008 | Heuer | |
| 2009/0067682 A1* | 3/2009 | Ohk | G06K 9/00228 |
| | | | 382/118 |
| 2009/0234716 A1* | 9/2009 | Mallick | G06F 3/0482 |
| | | | 705/14.54 |
| 2010/0246950 A1* | 9/2010 | De Kruif | H04N 1/6005 |
| | | | 382/167 |
| 2012/0113241 A1* | 5/2012 | Sundaresan | G06F 3/017 |
| | | | 348/77 |
| 2012/0287035 A1 | 11/2012 | Valko et al. | |
| 2013/0155330 A1* | 6/2013 | Longhurst | H04N 9/64 |
| | | | 348/708 |
| 2014/0267664 A1 | 9/2014 | Gross et al. | |
| 2014/0368629 A1 | 12/2014 | Lucet-Levannier et al. | |
| 2015/0326842 A1 | 11/2015 | Huai | |
| 2015/0339757 A1* | 11/2015 | Aarabi | G06Q 30/06 |
| | | | 705/12 |

FOREIGN PATENT DOCUMENTS

| | | |
|---|---|---|
| EP | 2380342 A1 | 10/2011 |
| EP | 3039864 A1 | 7/2016 |
| JP | 2013207721 A | 10/2013 |
| WO | 2008108763 A1 | 9/2008 |
| WO | 2015109693 A1 | 7/2015 |

OTHER PUBLICATIONS

Color IQ, https://www.sephora.comicolor-iq (printed Aug. 27, 2018).
BareMinerals MADE-2-FIT Makeup, https:itunes.apple.com/us/app/bareminerals-made-2-fit-makeup/id1227977554?mt=8 (printed Aug. 27, 2018).
Noor A. Ibraheem and Rafiqul Z. Khan "Multiple Histogram Technique for Robust Skin Color Based Segmentation" American Journal of Engineering Research (AJER), vol. 2, Issue 5, pp. 50-54, 2013.
Vladimir Vezhnevets et al. "A Survey on Pixel-Based Skin Color Detection Techniques" Graphics and Media Laboratory, Faculty of Computational Mathematics and Cybernetics, Moscow State University.
J. Marguier et al. "Assessing Human Skin Color from Uncalibrated Images" School of Computer and Communication Sciences, Ecole Polytechnique Fe'de'rale de Lausanne, Lausanne, Switzerland and Hewlett-Packard Laboratories, Palo Alto, CA. Feb. 9, 2007.
Hila Nachlieli et al. "Skin-Sensitive Automatic Color Correction" HP Laboratories. Feb. 6, 2009.
European Search Report dated Jun. 18, 2019, issued in application No. EP 18206578.9.

* cited by examiner

SYSTEMS AND METHODS FOR GENERATING SKIN TONE PROFILES

CROSS-REFERENCE TO RELATED APPLICATION

This application claims priority to, and the benefit of, U.S. Provisional Patent Application entitled, "Method and Apparatus of Skin Tone Estimation," having Ser. No. 62/681,174, filed on Jun. 6, 2018, which is incorporated by reference in its entirety.

TECHNICAL FIELD

The present disclosure generally relates to systems and methods for generating skin tone profiles of individuals depicted in digital images.

BACKGROUND

With the proliferation of smartphones, tablets, and other display devices, people have the ability to capture digital images virtually any time where application programs have become popular on smartphones and other portable display devices for managing and editing captured digital content. However, due to variations in the color temperature setting in cameras, environmental lighting, and so on, it can be difficult to accurately estimate attributes (e.g., skin tone) of the facial region of an individual depicted in a digital image. Therefore, there is a need for an improved system and method for estimating skin tone profiles.

SUMMARY

In accordance with one embodiment, a computing device with a digital camera obtains a reference image depicting at least one reference color and calibrates parameters of the digital camera based on the at least one reference color. The computing device captures, by the digital camera, a digital image of an individual utilizing the calibrated parameters. The computing device defines a region of interest in a facial region of the individual depicted in the digital image captured by the digital camera. The computing device generates a skin tone profile for pixels within the region of interest and displays a predetermined makeup product recommendation based on the skin tone profile.

Another embodiment is a system that comprises a digital camera, a memory storing instructions, and a processor coupled to the memory. The processor is configured by the instructions to obtain a reference image depicting at least one reference color and calibrate parameters of the digital camera based on the at least one reference color. The processor is further configured to capture, by the digital camera, a digital image of an individual utilizing the calibrated parameters. The processor is further configured to define a region of interest in a facial region of the individual depicted in the digital image captured by the digital camera. The processor is further configured to generate a skin tone profile for pixels within the region of interest and display a predetermined makeup product recommendation based on the skin tone profile.

Another embodiment is a non-transitory computer-readable storage medium storing instructions to be implemented by a computing device having a processor, wherein the instructions, when executed by the processor, cause the computing device to obtain a reference image depicting at least one reference color and calibrate parameters of a digital camera based on the at least one reference color. The processor is further configured to capture, by the digital camera, a digital image of an individual utilizing the calibrated parameters. The processor is further configured to define a region of interest in a facial region of the individual depicted in the digital image captured by the digital camera. The processor is further configured to generate a skin tone profile for pixels within the region of interest and display a predetermined makeup product recommendation based on the skin tone profile.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the disclosure can be better understood with reference to the following drawings. The components in the drawings are not necessarily to scale, with emphasis instead being placed upon clearly illustrating the principles of the present disclosure. Moreover, in the drawings, like reference numerals designate corresponding parts throughout the several views.

DETAILED DESCRIPTION

Figure 1:
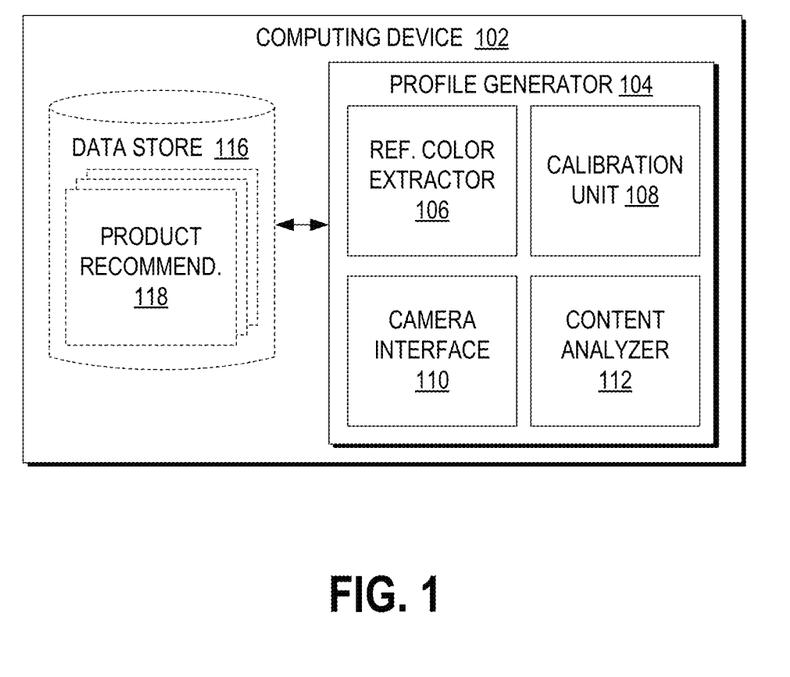
FIG. 1 is a block diagram of a computing device for generating skin tone profiles in accordance with various embodiments of the present disclosure.

Various embodiments are disclosed for accurately generating skin tone profiles of individuals depicted in digital images. Accurate determination of skin tone profiles is important for such applications as performing virtual application of makeup effects, recommending compatible makeup products, and so on. A description of a system for generating skin tone profiles is now described followed by a discussion of the operation of the components within the system. FIG. 1 is a block diagram of a computing device 102 in which the techniques for generating skin tone profiles disclosed herein may be implemented. The computing device 102 may be embodied as a computing device such as, but not limited to, a smartphone, a tablet computing device, a laptop, and so on.

A profile generator 104 executes on a processor of the computing device 102 and includes a reference color extractor 106, a calibration unit 108, a camera interface 110, and a content analyzer 112. The reference color extractor 106 is configured to obtain a reference image depicting one or more reference colors where the reference image may be depicted on a white balance card, a banknote, or other source with a known color scheme. The calibration unit 108 is configured to calibrate parameters of the digital camera based on the one or more reference colors.

The camera interface 110 is configured to cause a digital camera to capture a digital image of an individual. As one of ordinary skill will appreciate, the digital image may be encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or any number of other digital formats. Alternatively, the digital image may be derived from a still image of a video encoded in formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), 360 degree video, 3D scan model, or any number of other digital formats.

The content analyzer 112 is configured to define a region of interest in a facial region of the individual depicted in the digital image captured by the digital camera. The content analyzer 112 is further configured to generate a skin color profile for pixels within the region of interest. The content analyzer 112 is further configured to obtain makeup product recommendations 118 from a data store 116 based on the generated skin color profile and display the makeup product recommendation 118 in a user interface to the user of the computing device 102.

Figure 2:
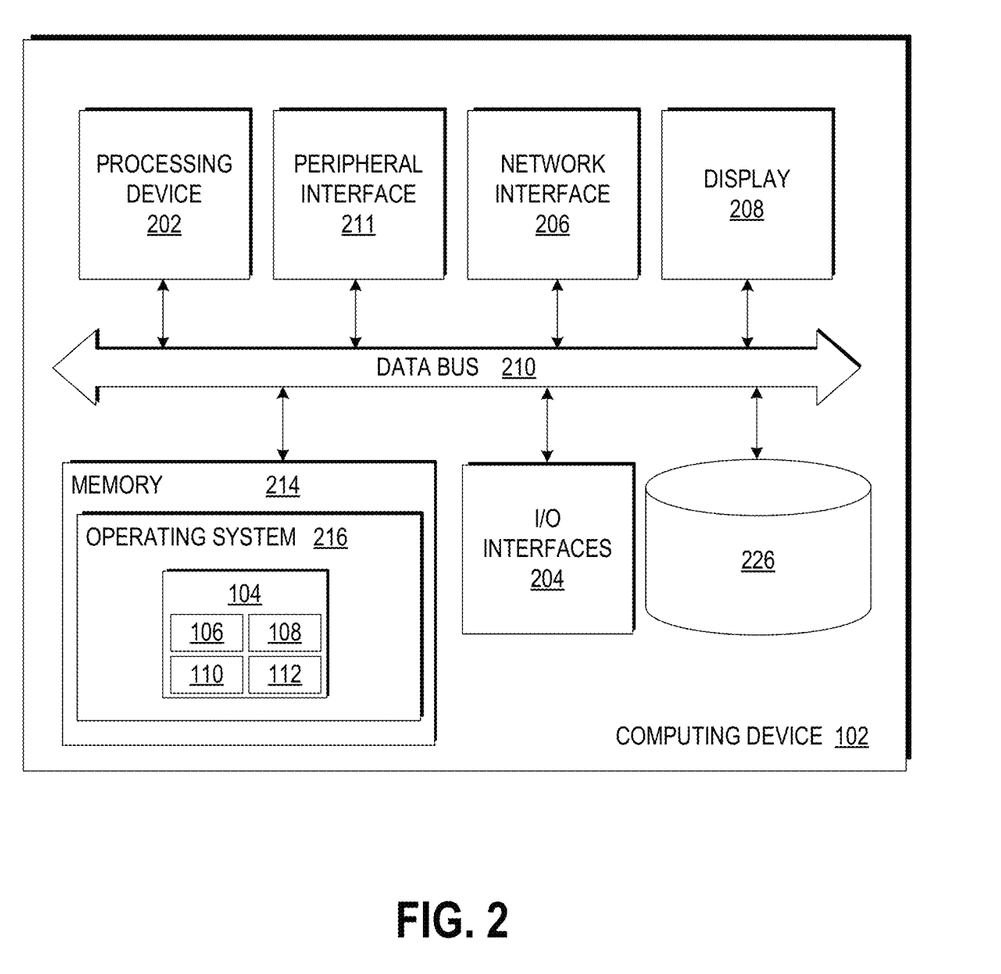
FIG. 2 is a schematic diagram of the computing device of FIG. 1 in accordance with various embodiments of the present disclosure.

FIG. 2 illustrates a schematic block diagram of the computing device 102 in FIG. 1. The computing device 102 may be embodied in any one of a wide variety of wired and/or wireless computing devices, such as a desktop computer, portable computer, dedicated server computer, multi-processor computing device, smart phone, tablet, and so forth. As shown in FIG. 2, the computing device 102 comprises memory 214, a processing device 202, a number of input/output interfaces 204, a network interface 206, a display 208, a peripheral interface 211, and mass storage 226, wherein each of these components are connected across a local data bus 210.

The processing device 202 may include any custom made or commercially available processor, a central processing unit (CPU) or an auxiliary processor among several processors associated with the computing device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 may include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the computing device 102 depicted in FIG. 1. In accordance with such embodiments, the components are stored in memory 214 and executed by the processing device 202, thereby causing the processing device 202 to perform the operations/functions disclosed herein. One of ordinary skill in the art will appreciate that the memory 214 can, and typically will, comprise other components which have been omitted for purposes of brevity. For some embodiments, the components in the computing device 102 may be implemented by hardware and/or software.

Input/output interfaces 204 provide any number of interfaces for the input and output of data. For example, where the computing device 102 comprises a personal computer, these components may interface with one or more user input/output interfaces 204, which may comprise a keyboard or a mouse, as shown in FIG. 2. The display 208 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
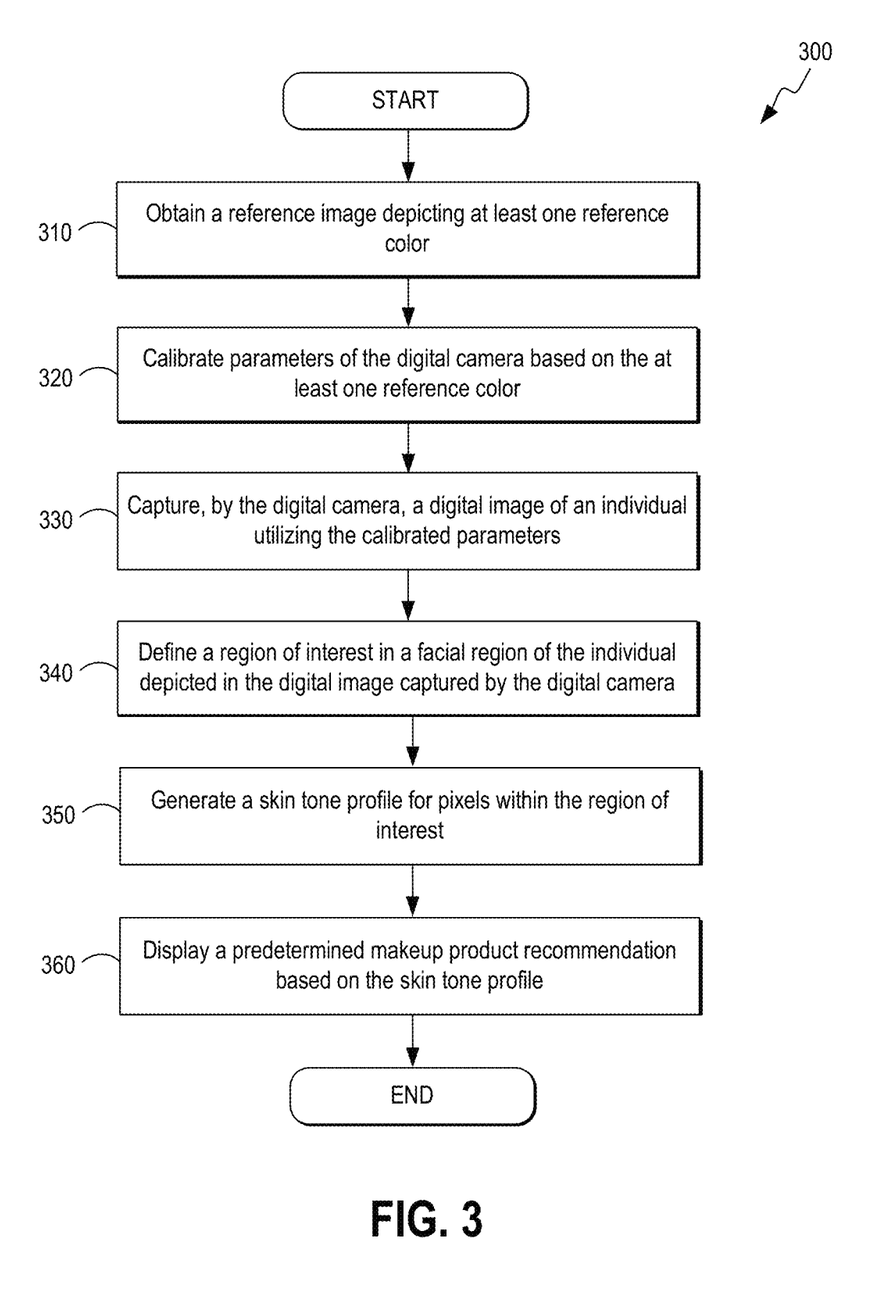
FIG. 3 is a top-level flowchart illustrating examples of functionality implemented as portions of the computing device of FIG. 1 for generating skin tone profiles according to various embodiments of the present disclosure.

Reference is made to FIG. 3, which is a flowchart 300 in accordance with various embodiments for generating skin tone profiles performed by the computing device 102 of FIG. 1. It is understood that the flowchart 300 of FIG. 3 provides merely an example of the different types of functional arrangements that may be employed to implement the operation of the various components of the computing device 102. As an alternative, the flowchart 300 of FIG. 3 may be viewed as depicting an example of steps of a method implemented in the computing device 102 according to one or more embodiments.

Although the flowchart 300 of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

At block 310, the computing device 102 obtains a reference image depicting at least one reference color. For some embodiments, the reference image can be depicted on such objects as a white balance card, a color checker, a banknote, a credit card, photocopy paper, tissue paper, a mobile phone, or a non-glossy white object. For such embodiments, the object depicting the reference image is located at a predefined distance from the digital camera.

At block 320, the computing device 102 calibrates parameters of the digital camera based on the at least one reference color, where such parameters may include white balance level, exposure compensation, gamma correction, and so on.

At block 330, the computing device 102 captures a digital image of an individual utilizing the calibrated parameters.

At block 340, the computing device 102 defines a region of interest in a facial region of the individual depicted in the digital image captured by the digital camera. For some embodiments, the computing device 102 defines the region of interest by determining a color distance between pixels in the facial region and one or more predetermined target skin tones and designating pixels within a threshold color distance of the one or more predetermined target skin tones as part of the region of interest.

For some embodiments, the computing device 102 defines the region of interest by identifying locations of predetermined feature points within the facial region and defining a boundary of the region of interest based on the locations of the predetermined feature points. To further illustrate, reference is made to FIG. 4, which illustrates definition of a region of interest 404 according to various embodiments. In the example shown, the computing device 102 analyzes the facial region 402 of the individual and identifies various feature points (shown as dots). The computing device 102 generates a region of interest 404 based on the location of the feature points.

Figure 4:
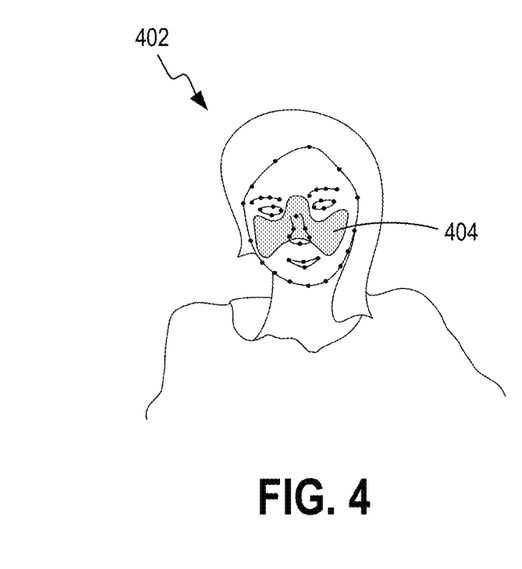
FIG. 4 illustrates a region of interest defined by the computing device in FIG. 1 according to various embodiments of the present disclosure.

In accordance with some embodiments, the computing device 102 detects the locations of various target feature points, which may comprise, for example, the eyes, nose, mouth, eyebrows, and so on. The target feature points may also include the overall facial contour of the user's face. The computing device 102 then defines a region of interest 404 based on the location of the feature points. As shown, the computing device 102 may be configured to define a boundary based on a series of parabolic curves defined at or near various feature points. In the example shown, the region of interest comprises the cheek and nose regions of the user. That is, in some embodiments, the region of interest may be predefined based on specific target regions or features of the user (e.g., the cheek and nose regions) where the boundary is then defined based on the actual feature points detected on the user's face such that the region of interest encompasses those target regions or features.

Referring back to FIG. 3, at block 350, the computing device 102 generates a skin tone profile for pixels within the region of interest. For some embodiments, the computing device 102 generates the skin tone profile by generating a luminance histogram for the pixels within the region of interest, removing predetermined portions of the luminance histogram to generate a target histogram portion, determining a dominant color value based on the target histogram portion, and generating the skin tone profile based on the determined dominant color value. The dominant color value may be determined by such techniques as calculating a mean of the target histogram, calculating a peak of the target histogram, calculating a weighted average of the target histogram, or by calculating a mean based on a mean-shift clustering algorithm of the target histogram.

The luminance histogram illustrates the distribution of pixel brightness of the region of interest, where the pixel brightness is typically computed using either the Y component in the YUV color space or the L component in the Lab (or CIELAB) color space. To further illustrate, reference is made to FIG. 5, which illustrates a luminance histogram 502 for pixels within the region of interest according to various embodiments. For some embodiments, the computing device 102 removes predetermined portions 504, 506 of the histogram to generate a target histogram portion.

Figure 5:
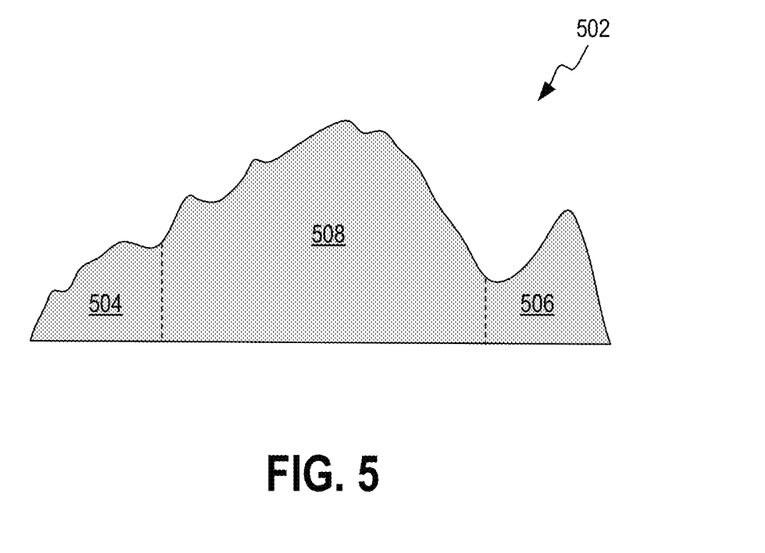
FIG. 5 illustrates a luminance histogram for pixels within the region of interest generated by the computing device in FIG. 1 according to various embodiments of the present disclosure.

One predetermined portion 506 may comprise, for example, the upper 30% of the histogram 502 that corresponds to pixels that are lighter (e.g., pixels that are part of a reflective portion). Specifically, the upper portion generally corresponds to the light reflection that occurs on the region of interest. Another predetermined portion 504 may comprise, for example, the lower 30% of the histogram 502 that corresponds to pixels that are darker (e.g., pixels that are part of a shadow region). Specifically, the lower portion generally corresponds to the shadow effect that occurs on the region of interest.

An average color value is determined based on the remaining histogram portion 508 (i.e., the target histogram portion), and the skin tone profile is generated based on the determined average color value. By excluding the predetermined upper and lower portions of the histogram 502, the computing device 102 is able to reduce the impact of light and shadow components on the average color calculation, thereby providing more accurate skin tone estimation.

For some embodiments, the computing device 102 generates the skin tone profile by extracting an illumination layer and a reflectance layer from the pixels within the region of interest and generating the skin tone profile based on the reflectance layer. For some embodiments, the computing device 102 generates the skin tone profile by converting a detected skin tone from a first color space to a second color space based on a predefined transformation matrix or by mapping a detected skin tone from a first classification to a second classification based on a predefined lookup table.

At block 360, the computing device 102 displays a predetermined makeup product recommendation based on the skin tone profile. For some embodiments, each product recommendation 118 in the data store 116 (FIG. 1) also includes a target RGB value or range of target RGB values associated with a target skin tone color. Note that instead of target RGB value(s), a target YUV value or range of target YUV values could be stored for each product recommendation 118. Similarly, a target Lab value or range of target Lab values could be stored for each product recommendation 118. The computing device 102 obtains one or more product recommendations 118 from the data store 116 by matching the estimated skin tone profile with one or more target RGB/YUV/Lab value(s) of corresponding product recommendations 118. Thereafter, the process in FIG. 3 ends.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method implemented in a computing device having a digital camera, comprising:
    obtaining a reference image depicting at least one reference color;
    calibrating parameters of the digital camera based on the at least one reference color;
    capturing, by the digital camera, a digital image of an individual utilizing the calibrated parameters;
    defining a region of interest in a facial region of the individual depicted in the digital image captured by the digital camera, wherein defining the region of interest in the facial region comprises:

determining a color distance between pixels in the facial region and one or more predetermined target skin tones; and designating pixels within a threshold color distance of the one or more predetermined target skin tones as part of the region of interest;

generating a skin tone profile for pixels within the region of interest; and displaying a predetermined makeup product recommendation based on the skin tone profile.

2. The method of claim 1, wherein the reference image is depicted on one of the following objects: a white balance card, a color checker, a banknote, a credit card, photocopy paper, tissue paper, a mobile phone, a non-glossy white object.

3. The method of claim 2, wherein the object depicting the reference image is located at a predefined distance from the digital camera.

4. The method of claim 1, wherein the parameters of the digital camera comprise at least one of: white balance level; exposure compensation; and gamma correction.

5. The method of claim 1, wherein defining the region of interest in the facial region comprises:
identifying locations of predetermined feature points within the facial region; and
defining a boundary of the region of interest based on the locations of the predetermined feature points.

6. The method of claim 1, wherein generating the skin tone profile for the pixels within the region of interest comprises:
generating a luminance histogram for the pixels within the region of interest;
removing predetermined portions of the luminance histogram to generate a target histogram portion;
determining a dominant color value based on the target histogram portion; and
generating the skin tone profile based on the determined dominant color value.

7. The method of claim 6, wherein determining the dominant color value based on the target histogram portion comprises one of:
calculating a mean of the target histogram;
calculating a peak of the target histogram;
calculating a weighted average of the target histogram; or
calculating a mean based on a mean-shift clustering algorithm of the target histogram.

8. The method of claim 1, wherein generating the skin tone profile for the pixels within the region of interest comprises:
extracting an illumination layer and a reflectance layer from the pixels within the region of interest; and
generating the skin tone profile based on the reflectance layer.

9. The method of claim 1, wherein generating the skin tone profile for the pixels within the region of interest comprises one of:
converting a detected skin tone from a first color space to a second color space based on a predefined transformation matrix; or
mapping a detected skin tone from a first classification to a second classification based on a predefined lookup table.

10. A system, comprising:
a digital camera;
a memory storing instructions;
a processor coupled to the memory and configured by the instructions to at least:

obtain a reference image depicting at least one reference color;
calibrate parameters of the digital camera based on the at least one reference color;
capture, by the digital camera, a digital image of an individual utilizing the calibrated parameters;
define a region of interest in a facial region of the individual depicted in the digital image captured by the digital camera, wherein the processor defines the region of interest in the facial region by:
determining a color distance between pixels in the facial region and one or more predetermined target skin tones; and
designating pixels within a threshold color distance of the one or more predetermined target skin tones as part of the region of interest;
generate a skin tone profile for pixels within the region of interest; and
display a predetermined makeup product recommendation based on the skin tone profile.

11. The system of claim 10, wherein the reference image is depicted on one of the following objects: a white balance card, a color checker, a banknote, a credit card, photocopy paper, tissue paper, a mobile phone, a non-glossy white object.

12. The system of claim 10, wherein the parameters of the digital camera comprise at least one of: white balance level; exposure compensation; and gamma correction.

13. The system of claim 10, wherein the processor defines the region of interest in the facial region by:
identifying locations of predetermined feature points within the facial region; and
defining a boundary of the region of interest based on the locations of the predetermined feature points.

14. The system of claim 10, wherein the processor generates the skin tone profile for the pixels within the region of interest by:
generating a luminance histogram for the pixels within the region of interest;
removing predetermined portions of the luminance histogram to generate a target histogram portion;
determining a dominant color value based on the target histogram portion; and
generating the skin tone profile based on the determined dominant color value.

15. The system of claim 10, wherein the processor generates the skin tone profile for the pixels within the region of interest by:
extracting an illumination layer and a reflectance layer from the pixels within the region of interest; and
generating the skin tone profile based on the reflectance layer.

16. A non-transitory computer-readable storage medium storing instructions to be implemented by a computing device having a processor, wherein the instructions, when executed by the processor, cause the computing device to at least:
obtain a reference image depicting at least one reference color;
calibrate parameters of a digital camera based on the at least one reference color;
capture, by the digital camera, a digital image of an individual utilizing the calibrated parameters;
define a region of interest in a facial region of the individual depicted in the digital image captured by the digital camera, wherein the processor defines the region of interest in the facial region by:

determining a color distance between pixels in the facial region and one or more predetermined target skin tones; and designating pixels within a threshold color distance of the one or more predetermined target skin tones as part of the region of interest; and generate a skin tone profile for pixels within the region of interest; and display a predetermined makeup product recommendation based on the skin tone profile.

17. The non-transitory computer-readable storage medium of claim 16, wherein the reference image is depicted on one of the following objects: a white balance card, a color checker, a banknote, a credit card, photocopy paper, tissue paper, a mobile phone, a non-glossy white object.

18. The non-transitory computer-readable storage medium of claim 16, wherein the parameters of the digital camera comprise at least one of: white balance level; exposure compensation; and gamma correction.

19. The non-transitory computer-readable storage medium of claim 16, wherein the processor defines the region of interest in the facial region by:

identifying locations of predetermined feature points within the facial region; and defining a boundary of the region of interest based on the locations of the predetermined feature points.

20. The non-transitory computer-readable storage medium of claim 16, wherein the processor generates the skin tone profile for the pixels within the region of interest by:

generating a luminance histogram for the pixels within the region of interest;

removing predetermined portions of the luminance histogram to generate a target histogram portion;

determining a dominant color value based on the target histogram portion; and generating the skin tone profile based on the determined dominant color value.

* * * * *